(12) United States Patent
Michael et al.

(10) Patent No.: US 7,203,925 B1
(45) Date of Patent: Apr. 10, 2007

(54) GRAPHICAL COMPILER

(75) Inventors: Ofer Michael, Newton, MA (US);
Nadav Popplwell, Hanegev (IL);
Hagay Dagan, Meshek (IL); Leo Cory,
Ramat Gan (IL)

(73) Assignee: EMC Corporation, Hopkinton, MA (US)

( * ) Notice: Subject to any disclaimer, the term of this patent is extended or adjusted under 35 U.S.C. 154(b) by 885 days.

(21) Appl. No.: 09/953,226

(22) Filed: Sep. 14, 2001

(51) Int. Cl.
*G06F 9/44* (2006.01)

(52) U.S. Cl. ...................... 717/109; 717/105

(58) Field of Classification Search ........ 717/140–161, 717/104, 105, 109, 113; 345/762–772; 715/762–772; 707/101, 104
See application file for complete search history.

(56) References Cited

U.S. PATENT DOCUMENTS

| | | | | |
|---|---|---|---|---|
| 5,386,571 A * | 1/1995 | Kurz | ........................ | 707/100 |
| 5,675,804 A * | 10/1997 | Sidik et al. | ................. | 717/139 |
| 5,737,737 A * | 4/1998 | Hikida et al. | ............ | 707/104.1 |
| 5,933,641 A * | 8/1999 | Ma | ............................ | 717/143 |
| 5,960,201 A * | 9/1999 | Ma et al. | ................... | 717/154 |
| 6,002,874 A * | 12/1999 | Bahrs et al. | ................ | 717/157 |
| 6,063,133 A * | 5/2000 | Li et al. | ..................... | 717/136 |
| 6,083,278 A * | 7/2000 | Olson et al. | ................ | 717/113 |
| 6,173,441 B1 * | 1/2001 | Klein | ......................... | 717/142 |
| 6,292,802 B1 * | 9/2001 | Kessenich et al. | .......... | 707/101 |
| 6,314,557 B1 * | 11/2001 | Shenderovich | ............. | 717/114 |
| 6,324,647 B1 * | 11/2001 | Bowman-Amuah | ........ | 713/201 |
| 6,353,923 B1 * | 3/2002 | Bogle et al. | ................ | 717/128 |
| 6,476,814 B1 * | 11/2002 | Garvey | ....................... | 345/440 |
| 6,493,868 B1 * | 12/2002 | DaSilva et al. | ............. | 717/105 |
| 6,609,248 B1 * | 8/2003 | Srivastava et al. | .......... | 717/147 |
| 6,647,544 B1 * | 11/2003 | Ryman et al. | ............. | 717/124 |
| 6,792,595 B1 * | 9/2004 | Storistenau et al. | ....... | 717/110 |
| 6,968,548 B1 * | 11/2005 | Tabbert | ..................... | 717/162 |
| 2004/0123276 A1 * | 6/2004 | Knueven et al. | ............ | 717/140 |

OTHER PUBLICATIONS

R. Schmidt, "Investigating Multilanguage Debugging and the New IDEs of Visual Studio 97", Microsoft Systems Journal, May 1997.*
M. Frohlich et al., "The Graph Visualization System daVinci—A User Interface for Applications", 1994.*

* cited by examiner

*Primary Examiner*—Wei Zhen
*Assistant Examiner*—Trenton J. Roche
(74) *Attorney, Agent, or Firm*—Fish & Richardson P.C.

(57) ABSTRACT

A system for displaying logical structure of heterogeneous source code includes a parser configured to read the source code and to generate parsed code. A code mapper having access to the parsed code is configured to generate from that parsed code a map representative of the logical structure of the heterogeneous source code.

36 Claims, 8 Drawing Sheets

GRAPHICAL COMPILER

FIELD OF INVENTION

This invention relates to software development, and in particular, to tools for management of a complex software system.

BACKGROUND

In the early days of programming, a software developer confronted with the task of writing a program to perform a task would create a monolithic body of instructions for performing that task. Because of the difficulties associated with communicating with a processor using its native machine language instructions, these functions and procedures were often expressed in a more human-understandable language, often referred to as a "programming language." This expression of instructions, referred to as "source code," was then provided to a translator, for example an interpreter, a compiler, or an assembler, which then re-expressed it in a form that could be understood by the machine. The source code was typically a single, indivisible entity stored as a single file. This resulted in code that was difficult to maintain and debug.

As programming languages evolved, it became possible to use certain programming constructs, for example functions and procedures, to perform certain elementary tasks. These programming constructs could be self-contained entities that performed well-defined tasks on particular arguments. Their scope could be controlled to perform those tasks without interfering with the operation of other functions and procedures. Programming constructs that performed related tasks could then be stored as separate files and maintained separately from programming constructs that performed different tasks. This enabled source code to be written as independent modules by different developers. The resulting collection of modules could then be assembled into the desired software system. A software system built out of self-contained modules in this way was far easier to maintain and debug.

Because all source code is ultimately translated into machine language, the particular language used to express the source code is irrelevant to the processor. So long as the processor receives its instructions in its native machine language, it will perform correctly. This fact, combined with the idea of modular programming, suggests that the choice of programming language can be varied depending on the nature of the task to be performed. For example, a simple but frequently executed loop can be more easily optimized for performance when written in assembly language. Instructions for performing complex tasks, on the other hand, are often more easily expressed in a higher-level language.

As a software system evolves, new modules are added, obsolete modules are deleted, and existing programming constructs are re-shuffled between modules. In a large software system, these tasks are often performed by many different programmers over an extended period. This eventually results in byzantine links between modules, many of which might be obsolete or redundant. Source code that evolves in such a haphazard manner is prone to bugginess, difficult to maintain, and virtually impossible to optimize for performance.

At certain times in the evolution of software systems, usually after a major release, an urge to rectify the mistakes of their predecessors arises among the developers. In most cases, by the time this occurs, the system has become so difficult to maintain that it is virtually impossible to anticipate the full consequences of even small changes to the source code. Because of the dangers that accompany major re-organization of source code, there exists an unfortunate, but understandable, tendency for software systems to become fossilized over time.

SUMMARY

The invention provides the developer with a graphical compiler for efficiently identifying links between entities in a software system. This enables the developer to maintain source code by showing links to and from a particular entity. By assisting the developer in locating all entities that might be affected by a particular entity, the graphical compiler enables developers to spend more time optimizing source code and less time searching for opportunities to optimize the source code.

In addition, by providing information on the manner in which individual entities are linked, a graphical compiler in accord with the invention facilitates the re-organization of source code to eliminate unnecessary links between entities and to arrange entities into logical groups, greatly simplifying the maintenance of the source code.

The graphical compiler of the invention thus performs a function that is the converse of that performed by a conventional compiler. Just as a conventional compiler translates source code into machine-readable form, the graphical compiler translates the same source code into a more human-understandable form.

In one embodiment, a system for displaying logical structure of heterogeneous source code includes a parser configured to read the source code and to generate parsed code from that source code. The parsed code is then made available to a code mapper configured to generate from the parsed code a map representative of the logical structure of the source code. As used herein, heterogeneous source code refers to source code having constituent elements expressed in different programming languages.

The parsed code can include information other than that available from reading the source code. For example, the parsed code can also include management information. Such management information can include information about the source code that is not found by examining the source code.

The system can also include a user-interface in communication with the code mapper. This user-interface is configured to enable a user to provide instructions to the code mapper for controlling display of the logical structure.

Source code can be viewed as a collection of entities linked to each other. The code mapper can thus be configured to select an entity from the source code and to include that entity in the map. Entities that might be selected include modules, super-modules, individual files, and individual programming constructs.

In many cases, an entity includes constituent entities, referred to as "child entities." In one embodiment, the system is configured to display one or more child entities associated with the selected entity.

In other cases, it is useful to identify entities that are referred to by a selected entity and entities that refer to a selected entity. Consequently, another embodiment of the invention provides a code tracer in communication with the parsed code for identifying either entities that refer to a selected entity, entities that are referred to by a selected entity, or both.

These and other features of the invention will be apparent from the following detailed description and the accompanying drawings, in which:

DETAILED DESCRIPTION

At an abstract level, a software system can be viewed as a collection of "entities" together with links between those entities. An entity might be a programming construct such as a function or a procedure. However, entities can also be collections (referred to as "modules") of functions and procedures, groups of such modules ("super-modules"), or even groups of super-modules. An entity can also be a more elementary programming construct than a function. In principle, each statement, or each line of code, can be an entity within the meaning of this specification.

A software system can thus be represented as a directed graph of nodes and links, with each node representing one such entity and with the links showing references from one entity to another. If the entity is selected to be a module, then the graph shows references between modules. If the entity is selected to be a programming construct, the graph shows references between the individual programming constructs.

Figure 1:
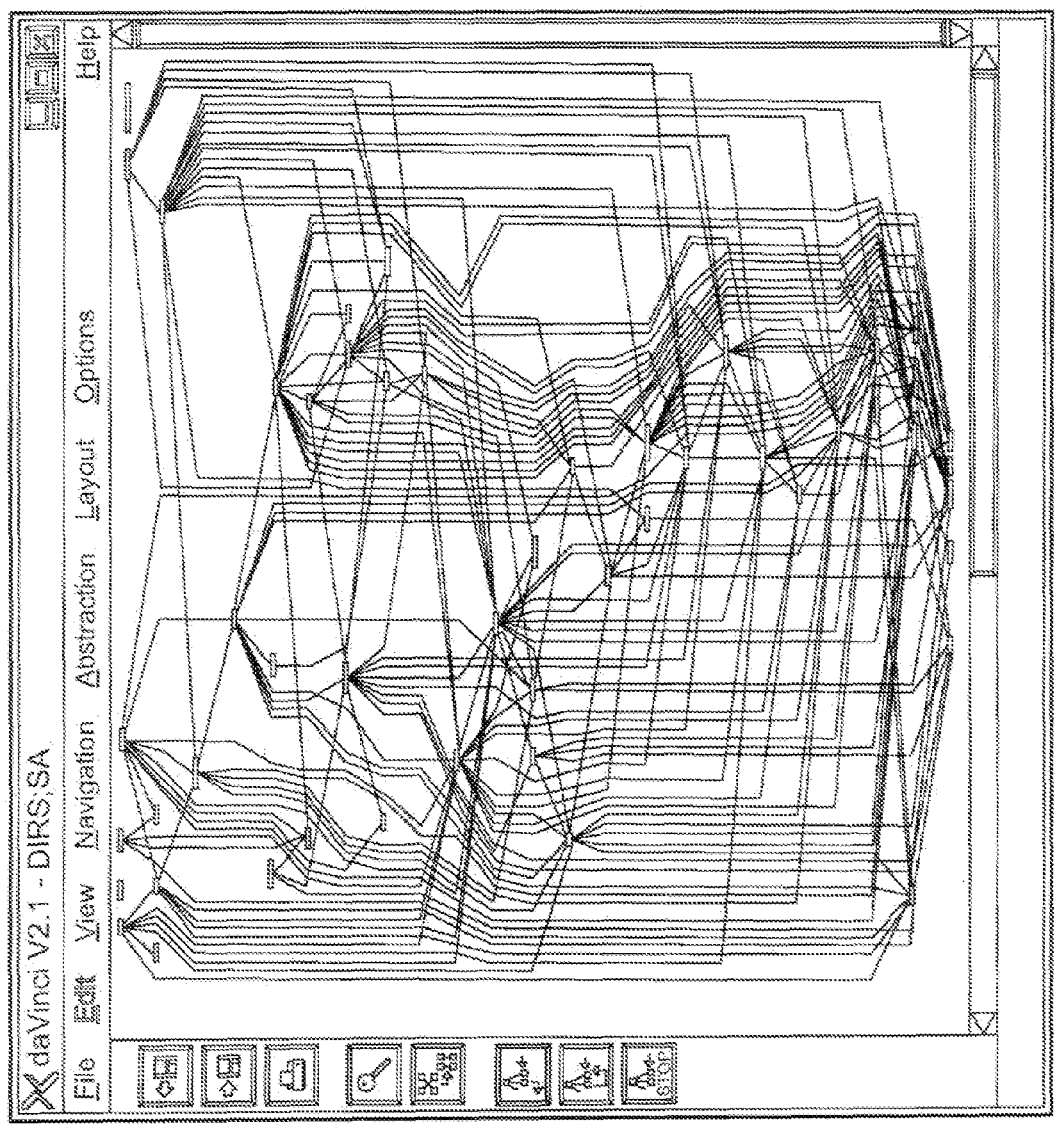
FIG. 1 is a directed graph representative of a software system.

FIG. 1 shows a complex software system 10 represented as a directed graph of entities 12 connected by links 14. Because of the complexity of the link structure shown in FIG. 1, it is difficult to determine at a glance what entities are connected, directly or indirectly, to what other entities. A software system 10 represented by a directed graph of such complexity is likely to be difficult to maintain. In addition, the compilation time of the source code corresponding to the system 10 is likely to be unnecessarily long.

The graph of FIG. 1 can be viewed as the software analog of a hardware circuit diagram. When designing hardware, it is preferable to lay out connections between components in a somewhat organized fashion. So called "spaghetti circuits", in which jumbles of wires cross over other jumbles of wires to connect elements scattered on a circuit board, are frowned upon for good reason. While such circuits can be made to work, malfunctions are difficult to trace and repair. Furthermore, only the most daring would attempt to re-wire the circuit.

The layout of a software system, like that of a hardware system, can also suffer from disorganization. Like hardware systems, poorly laid out software systems can be made to work. However, unlike a hardware system (which in most cases has to at least fit into a box), a software system's layout is virtually free of physical constraints. This absence of physical constraints on complexity, combined with the inability to actually see the system, makes it difficult to "re-wire" source code.

A graphical compiler according to the invention provides a window into the underlying logical structure of the source code. The view through this window enables developers to experiment interactively with alternative logical structures without the need to actually implement them. In effect, just as a conventional compiler translates source code into machine-readable form, the graphical compiler described herein translates the same source code into a more human-understandable form.

Figure 2:
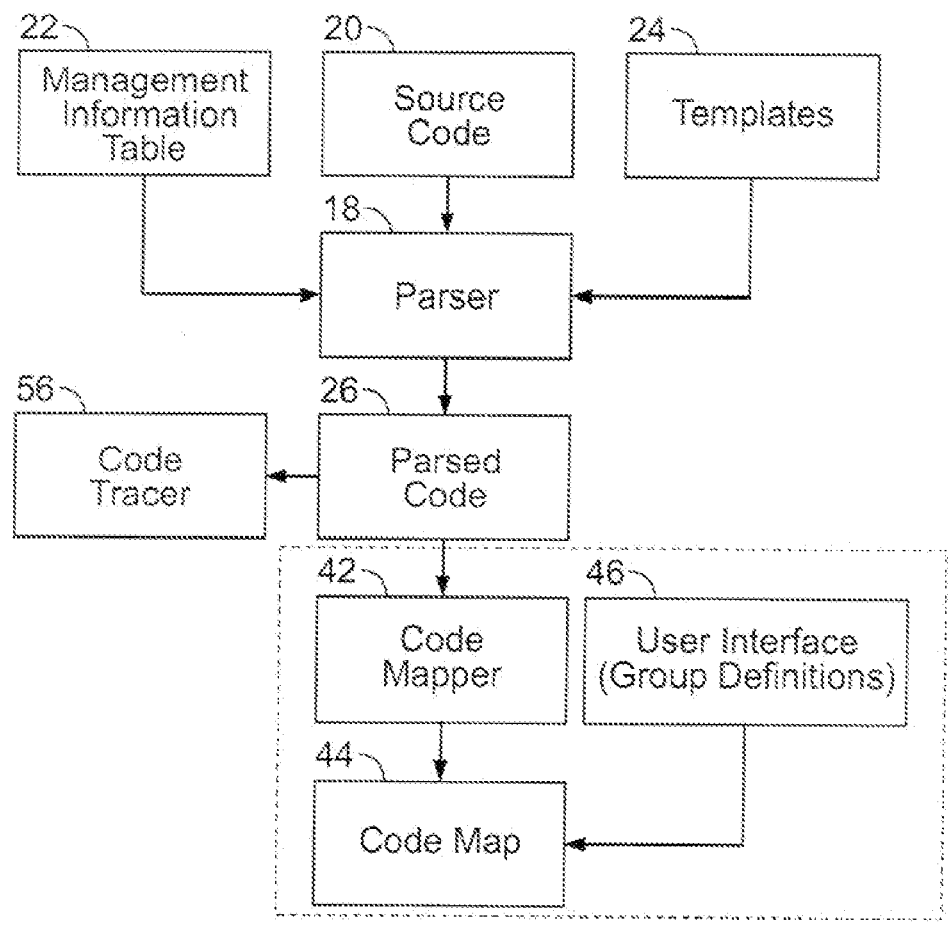
FIG. 2 shows a representative architecture of a graphical compiler.

A first step in obtaining a view of the underlying logical structure of source code is to analyze the source code to identify its constituent entities and the links between those entities. In a graphical compiler 16 incorporating the principles of the invention, shown in FIG. 2, this is performed by a parser 18 that accepts heterogeneous source code 20, management information stored in a management-information table 22, and user-defined templates 24. The parser 18 uses these inputs to create parsed code 26. The entities that constitute the heterogeneous source code 20 are expressed in two or more programming languages"""". In particular, the source code 20 can include portions expressed in assembly language and portions expressed in C, or one of the many dialects thereof.

In most cases, the process of creating parsed code 26 is a time-consuming process, similar in magnitude to the process undertaken by a compiler in generating executable code. Thus, the parser 18 is only run periodically, and usually in tandem with the running of a compiler on the same source code.

Figure 3:
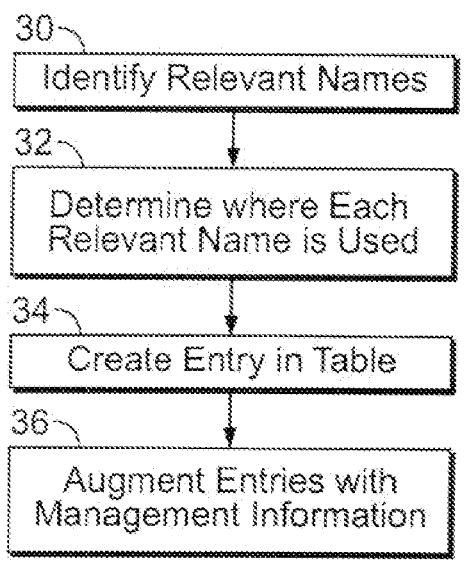
FIG. 3 is a flowchart showing the process carried out by the parser in FIG. 2.

Referring now to FIG. 3, the parser 18 scans all files making up the source code 20 in search of relevant names (step 30). These relevant names include names of functions, variables, procedures, data structures, and macros. The parser 18 then determines where in the source code 20 each relevant name occurs (step 32) and builds a name table having an entry for each relevant name (step 34). This entry includes a list of all entities in which that relevant name appears. The level of detail in the entry can be controlled by a switch that is set as part of a command string that runs the parser 18. For example, an entry can be sufficiently detailed so that it lists the actual line in which a relevant name occurs in an entity.

Each entry in the name table can be augmented (step 36) by management information from the management-information table 22 provided to the parser 18. The management-information table 22 can include information associated with each entity in the source code 20. Thus, when a relevant name is recognized as occurring in a particular entity, the corresponding entry for that entity in the management-information table 22 can be inspected. Any management information contained in that entry can then be included in the name table.

Examples of management information associated with an entity include information about the author or designated author of the entity. Additional examples include information about the person responsible for maintaining a particular entity, or statistics associated with the revision history of that entity. The definition and selection of what management information to collect is under the control of the user. In general, management information includes information about an entity, as distinguished from information from within the entity. By way of analogy, names of characters or places would make up the "relevant names" in a library copy of a novel. The corresponding "management information"

would then include information such as the call number, the list of people who have borrowed it, and so on.

In some cases, a relevant name may represent a macro, the details of which are unimportant from the point of view of one engaged in re-organizing the source code. These macros are typically built-in system utilities that actually include several instructions. From the user's point of view, however, what is important is that the macro has been called and the entities that interact with the macro. To accommodate these and other special cases, the parser 18 consults the user-defined template 24. The user-defined template 24 lists any special cases that are to be identified by the parser 18 together with instructions on what actions to take to accommodate those special cases.

Referring again to FIG. 2, a code mapper 42 in communication with the parsed code generates an interactive code map 44 that provides a visual overview of the source code 20. The code map 44 takes the form of a directed graph in which nodes correspond to entities in the source code 20 and links correspond to references from one entity to another. Interaction between the user and the code map 44 is made possible by a graphical user interface 46 in communication with the code map 44 and the user. The graphical user interface 46 enables conventional graphical user interface actions such as pointing and clicking to select screen objects, dragging, choosing menu commands, and specifying instructions in dialog boxes.

Figure 4:
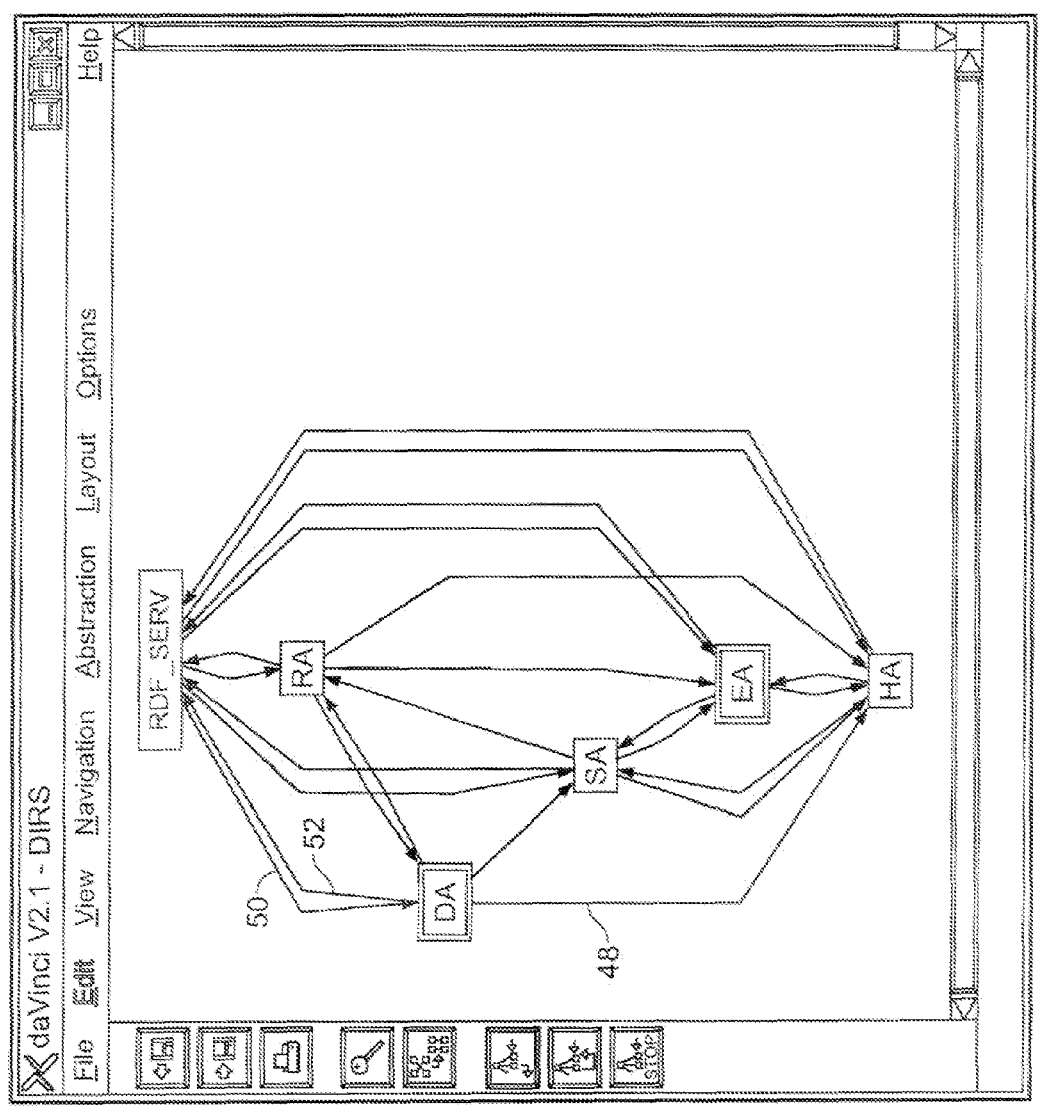
FIG. 4 is a representative code map.

The representative code map 44 in FIG. 4 displays entities from a remote mirroring system. In this case, each entity is a module that contains related programming constructs, such as functions or procedures. For example, the module named "DA" contains programming constructs that control disk access. The module named "HA" contains programming constructs that interact with a host terminal.

The arrows between modules show references from one module to another. As indicated by a first arrow 48, there exist certain functions and procedures in the module "DA" that refer to other functions and procedures that are part of the module "HA." The absence of any arrows pointing in the reverse direction indicates that there are no programming constructs in the module "HA" that refer back to programming constructs in the module "DA."

In one embodiment of the invention, the visual appearance of arrows connecting one entity to another can be altered to reflect the nature and extent of references between those entities. For example, a lightly shaded arrow 50 pointing from module "RDF_SERV" to module "DA" indicates that only a few of the programming constructs in "RDF_SERV" refer to programming constructs in "DA." A heavy arrow 52 pointing in the opposite direction, from "DA". to "RDF_SERV," indicates that a considerable number of programming constructs in "DA" refer to programming constructs in "RDF_SERV." Variations in the visual appearance of arrows can include variations in shading, thickness, color, and texture of the line, variations in the shape, size, color and texture of the arrowhead, or any combination thereof.

In another embodiment of the invention, one or more entities shown on a first code-map can be selected for expansion. Expansion of an entity in a first code-map results in the display of a second code-map. This second code-map shows child entities that are contained within the expanded entity (referred to as the "parent entity") from the first code-map, together with links between those child entities. The invention thus provides a hierarchical sequence of code maps in which, in general, entities on any one code map can be selected and expanded to show additional detail. This hierarchy of code maps permits the visualization of the source code structure at varying levels of detail.

Figure 5:
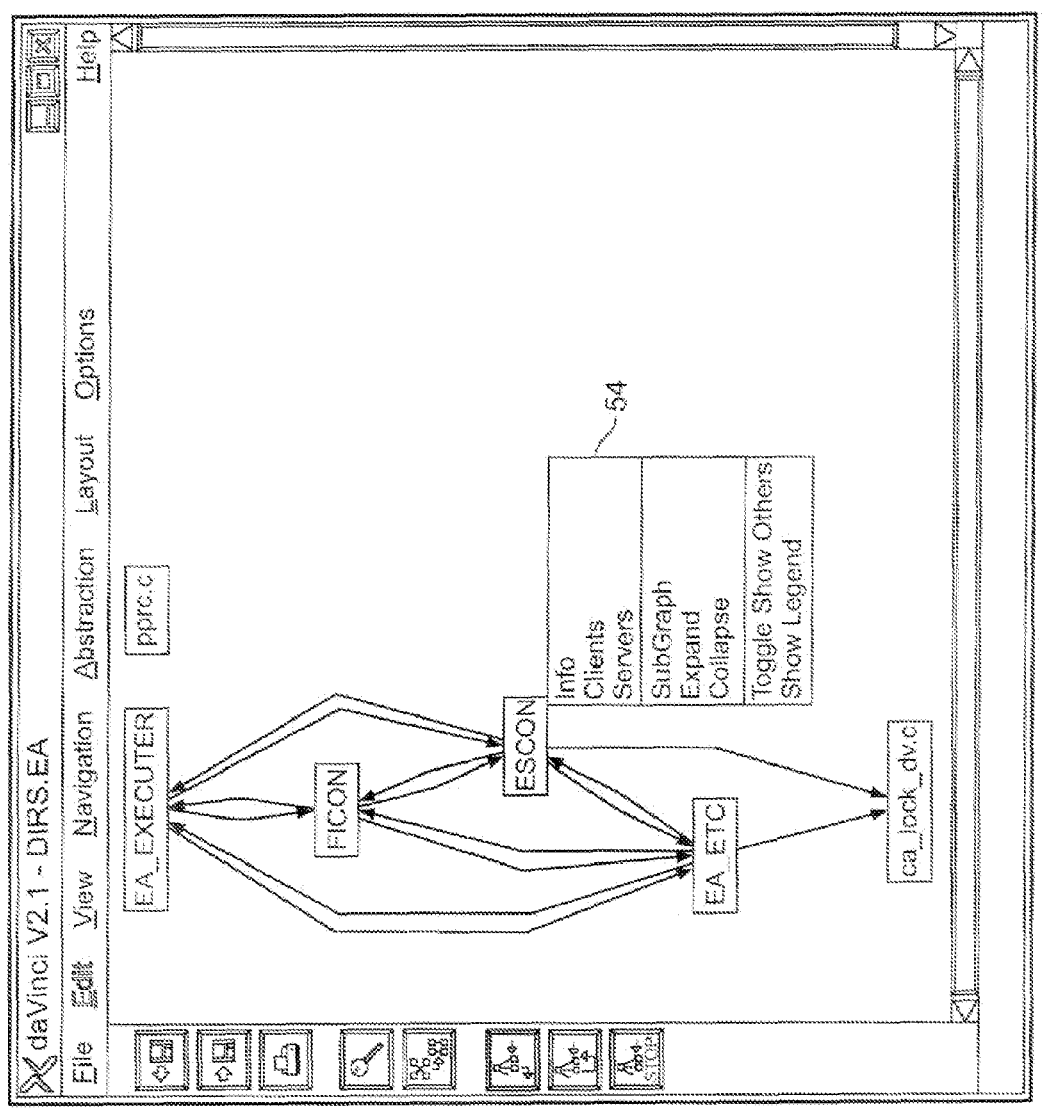
FIG. 5 is a representative code map obtained by expanding one of the entities shown in the code map of FIG. 4.

FIG. 5 shows a second code-map obtained by expanding the "EA" entity in FIG. 4. The second code-map shows that the "EA" entity has several child entities ("EA_EXECUTER," "FOCIN," "ESCON," "EA_ETC," "ca_lock_dv.c" and "pprc.c"). Of these child entities, two ("ca_lock_dv.c" and "pprc.c") are files containing portions of source code 20; the remaining child entities are most likely collections of files. Starting with the second code-map in FIG. 5, one could expand (by choosing "Expand" from the pop-up menu) a child entity to generate a third code-map showing child entities of that child entity. This process of expanding entities to reveal additional underlying structure can proceed until the most atomic entities (such as individual instructions) are shown.

The graphical compiler 16 of the invention also provides ready access to management information regarding a selected entity. For example, in FIG. 5, choosing "Info" from the pop-up menu 54 opens a dialog box containing management information from the management-information table 22 corresponding to the selected entity.

One benefit of visualizing the source code 20 with a map is that isolated bodies of source code can be readily identified. For example, it is clear from FIG. 5 that there are no links between "pprc.c" and any other entity. This raises the possibility that "pprc.c" may not be necessary and can be removed from the source code 20.

The ability to visualize source code 20 also enables a user to easily identify undesired links. For example, it may be desirable, to facilitate code maintenance, for certain entities to only be referred to and not to refer to any other entities. An example of such an entity is the "HA" entity in FIG. 4. With a graphical display of the type provided by the code mapper 42, it is a simple matter to identify errant references originating from such an entity.

The code mapper 42 also provides for simulating the effect of rearranging the entities within the source code 20. To do so, the user specifies a child entity to be moved and a proposed-parent entity to receive that child entity. Having done so, the user instructs the code mapper 42 to re-generate the map. The resulting map would then show what the links between entities would be if the child entity were moved from its parent entity to the proposed-parent entity.

Figure 6:
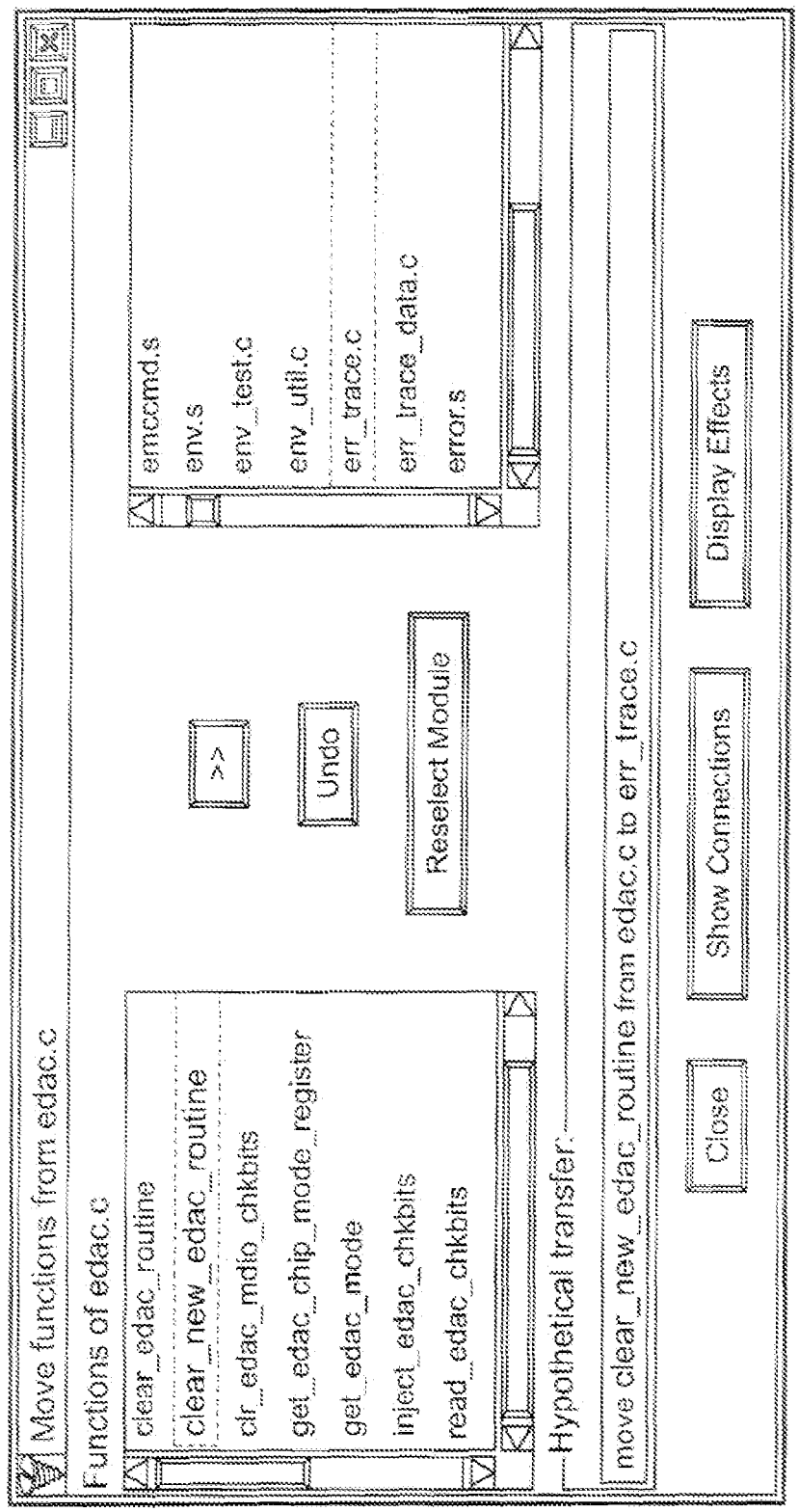
FIG. 6 is a representative user-interface for simulating the alteration of the logical structure of a body of source code.

FIG. 6 shows one user interface, in this case a dialog box, for specifying a child entity and a proposed-parent entity as described above. In the illustrated dialog box, the user has specified that the child entity "clear_new_edac_routine," which is presently in the file "edac.c," is to be moved to the file "err_trace.c."

Figure 7:
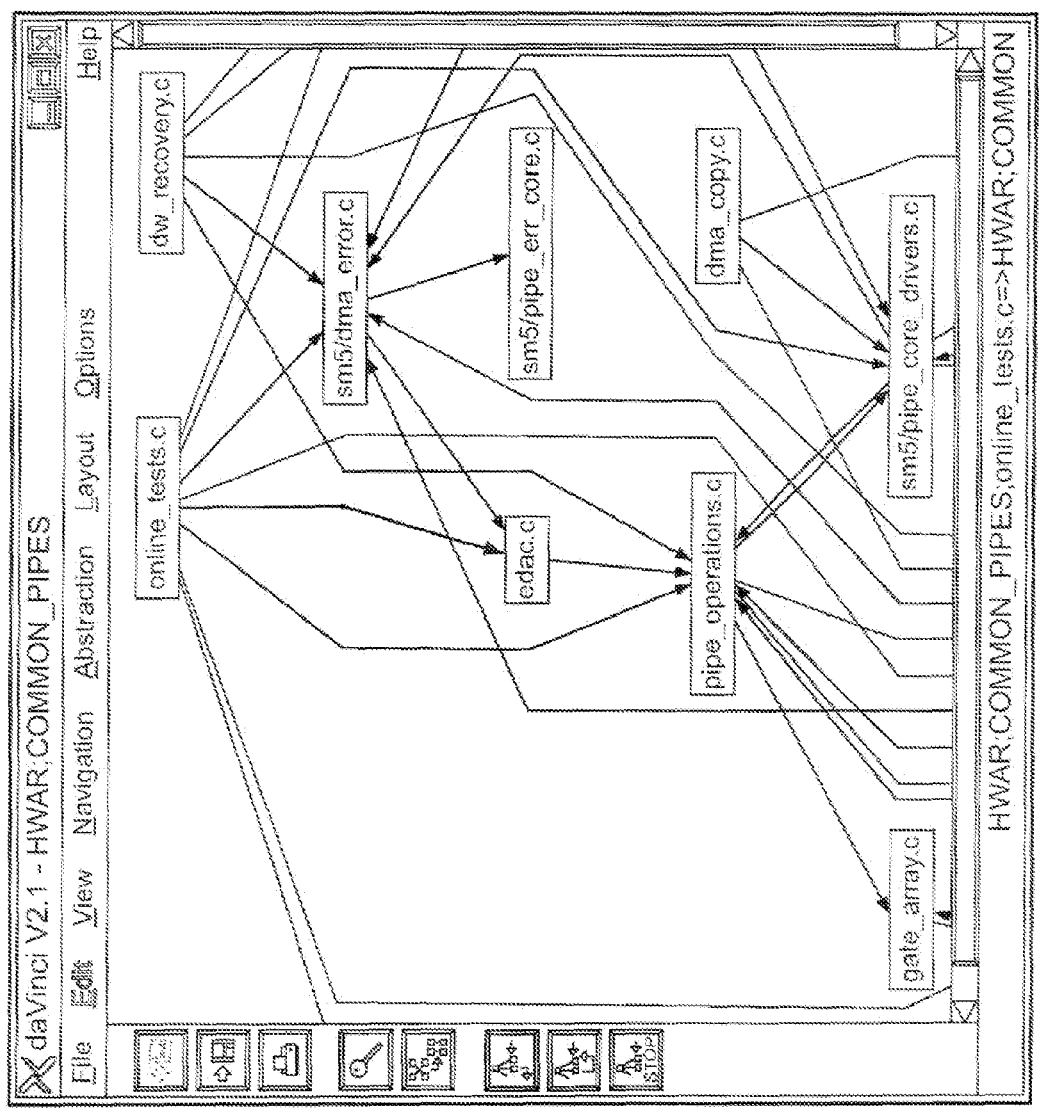
FIGS. 7 and 8 show code maps before and after a change in the logical structure of source code.
Figure 8:
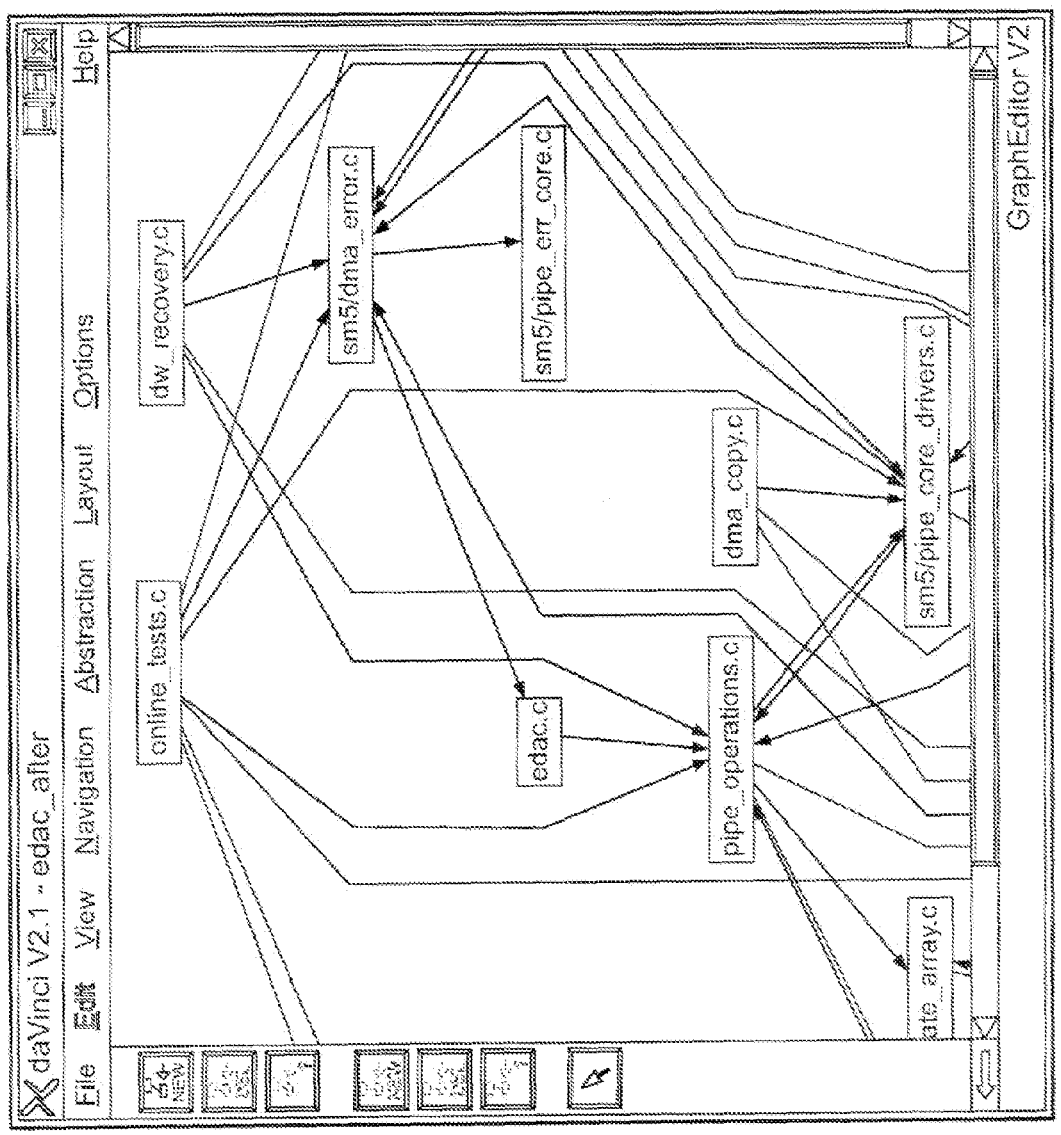

FIGS. 7 and 8 show maps of the source code before and after the hypothetical transfer proposed in FIG. 6 is performed. A comparison of these figures shows that the hypothetical transfer has eliminated a reference from the entity "online_testc.c" to "edac.c".

The user interface shown in FIG. 6 provides an interface through which a user can simulate organizing and re-organizing the source code at any level of the hierarchy of entities. Using the user-interface, the user can define new entities, move one or more child entities from parent entities to proposed-parent entities, and destroy existing entities. For each configuration of entities, the code mapper 42 generates a code map showing updated relationships between elements in the source code 20. Since each new configuration of the source code 20 is only simulated, a user can easily experiment with various configurations without the risk of inadvertently compromising the integrity of the source code 20.

Referring again to FIG. 2, the graphical compiler 16 also includes a code tracer 56 for displaying information indicative of those entities ("referring entities") that refer to a selected entity and those entities ("referred entities") that are referred to by the selected entity. Although this information is discernible by examining the code map 44 provided by the code mapper 42, it is often more convenient to condense this information into a dialog box as shown in FIG. 9.

Figure 9:
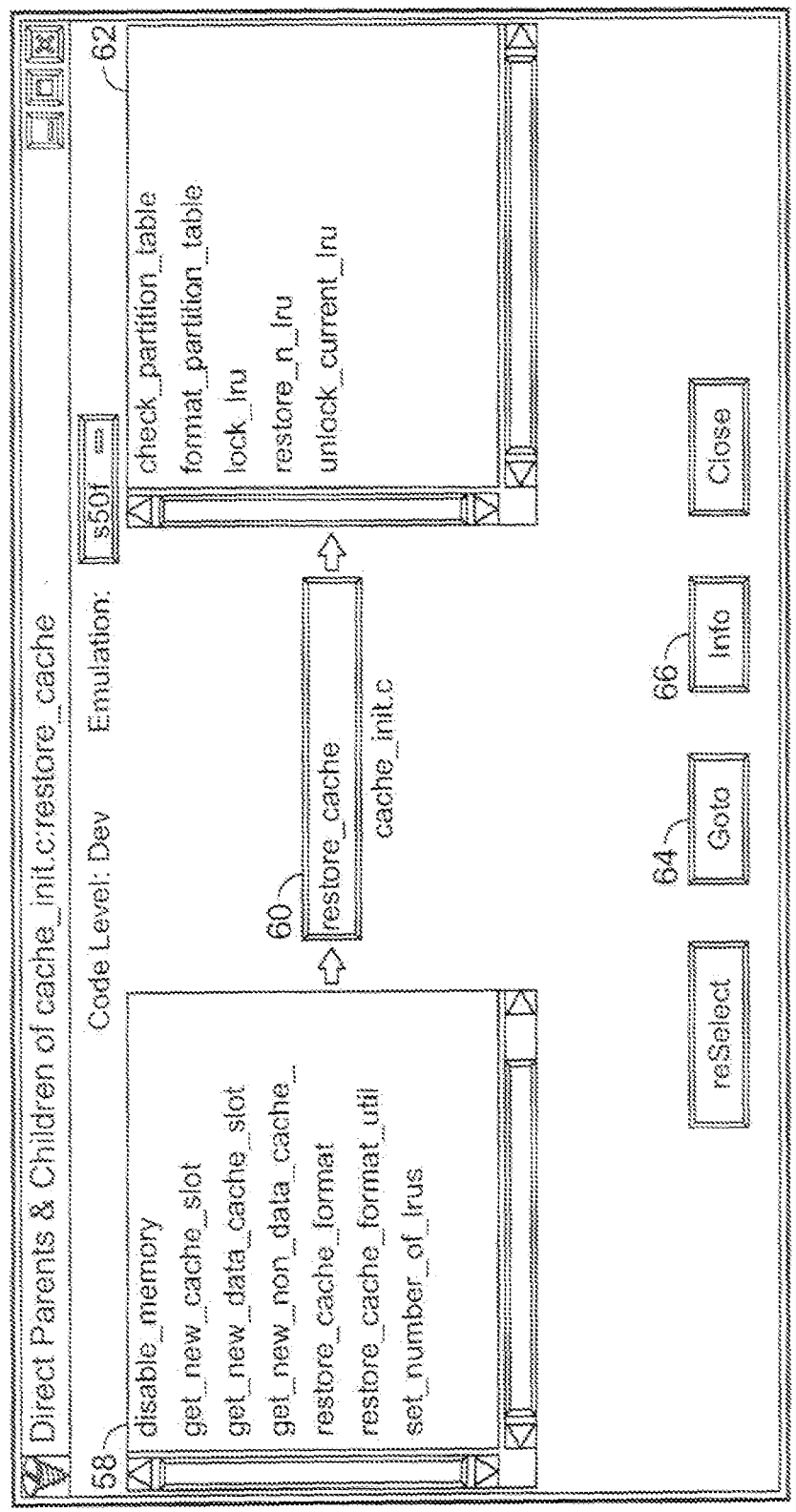
FIG. 9 is a representative user-interface showing parents and children of a selected entity.

FIG. 9 shows a dialog box having a referring-entity list 58 that lists the various functions and procedures that refer to the "restore_cache" procedure listed in a selected-entity field 60. As indicated below the selected-entity field 60, the code for the "restore_cache" procedure is found in the file "cache_init.c." The dialog box also includes a referred-entity list 62 that lists the various functions and procedures to which "restore_cache" refers. Other entities can be selected by, for example, selecting a name on one of the lists and clicking the "GoTo" button 64. Management information about a selected entity can be viewed by clicking the "Info" button on the dialog box 66.

In one embodiment, the code tracer 56 is run directly from an editor used for editing the source code 20. In this embodiment, a menu command on the editor's menu bar can be linked to the code tracer 56. The selected entity listed by default in the selected-entity field 60 can be made to correspond to whatever is in the editing window of the editor.

Having described the invention, and a preferred embodiment thereof, what we claim as new and secured by Letters Patent is:

1. A method for displaying the logical structure of heterogeneous source code, said method comprising:
   providing source code having a first constituent entity expressed in a first programming language and a second constituent entity expressed in a second programming language;
   generating a table containing information indicative of a relationship between said first constituent entity and said second constituent entity of said source code; and
   displaying said relationship between said first and second constituent entities,
   wherein displaying said relationship comprises displaying a map of said relationship;
   wherein displaying said map comprises:
      displaying a first object representative of said first constituent entity;
      displaying a second object representative of said second constituent entity; and
      connecting said first object to said second object by a graphical connecting entity,
   the method further comprising selecting said graphical connecting entity on the basis of said relationship between first constituent entity and said second constituent entity.

2. The method of claim 1, further comprising selecting said first constituent entity to include an assembly language module and selecting said second constituent entity to include a higher-level language module.

3. The method of claim 1, further comprising selecting said first constituent entity from a group consisting of a module, a function, a procedure, an instruction, a set of modules, a set of functions, a set of procedures, and a set of instructions.

4. The method of claim 1, wherein generating a table comprises incorporating management information into said table.

5. The method of claim 4, further comprising selecting said management information to include information indicative of a designated authority associated with said first constituent entity.

6. The method of claim 1, further comprising selecting said relationship to include existence of a shared entity common to said first and second constituent entities.

7. The method of claim 1, further comprising selecting said relationship to include a reference from said constituent entity to said second constituent entity.

8. The method of claim 1, further comprising configuring said first object to display, in response to a stimulus, an additional map indicating a relationship between a first child entity belonging to said fist constituent entity and a second child entity belonging to said first constituent entity.

9. The method of claim 1, wherein displaying said relationship comprises listing said second constituent entity in response to selection of said first constituent entity.

10. A computer-readable medium having encoded thereon software for displaying the logical structure of heterogeneous source code, said software comprising instructions for:
   reading source code having a first constituent entity expressed in a first programming language and a second constituent entity expressed in a second programming language;
   generating a table containing information indicative of a relationship between said first constituent entity and said second constituent entity of said source code; and
   displaying said relationship between said first and second constituent entities;
   wherein said instructions for displaying said relationship comprise instructions for displaying a map of said relationship;
   wherein said instructions for displaying said map comprise instructions for:
      displaying a first object representative of said first constituent entity;
      displaying a second objecting representative of said second constituent entity; and
      connecting said first object to said second object by a graphical connecting entity; and
   wherein said software further comprises instructions for selecting said graphical connecting entity on the basis of said relationship between first constituent entity and said second constituent entity.

11. The computer-readable medium of claim 10, wherein said software further comprises instructions for selecting said first constituent entity to include an assembly language module and selecting said second constituent entity to include a higher-level language module.

12. The computer-readable medium of claim 10, wherein said software further comprises instructions for selecting said first constituent entity from a group consisting of a module, a function, a procedure, an instruction, a set of modules, a set of functions, a set of procedures, and a set of instructions.

13. The computer-readable medium of claim 10, wherein said instructions for generating a table comprise instructions for incorporating management information into said table.

14. The computer-readable medium of claim 13, wherein said software further comprises instructions for selecting said management information to include information indicative of a designated authority associated with said first constituent entity.

15. The computer-readable medium of claim 10, wherein said software further comprises instructions for selecting said relationship to include existence of a shared entity common to said first and second constituent entities.

16. The computer-readable medium of claim 10, wherein said software further comprises instructions for selecting said relationship to include a reference from said first constituent entity to said second constituent entity.

17. The computer-readable medium of claim 10, wherein said software further comprises instructions for configuring said first object to display, in response to a stimulus, an additional map indicating a relationship between a first child entity belonging to said first constituent entity and a second child entity belonging to said first constituent entity.

18. The computer-readable medium of claim 10, wherein instructions for displaying said relationship comprise instructions for listing said second constituent entity in response to selection of said first constituent entity.

19. A method for displaying the logical structure of heterogeneous source code, said method comprising:
   providing source code having a first constituent entity expressed in a first programming language and a second constituent entity expressed in a second programming language;
   generating a table containing information indicative of a relationship between said first constituent entity and said constituent entity of said source code; and
   displaying said relationship between said first and second constituent entities
   wherein displaying said relationship comprises displaying a map of said relationship, and
   wherein displaying said map comprises:
      displaying a first object representative of said first constituent entity;
      displaying a second object representative of said second constituent entity; and
      connecting said first object to said object by a graphical connecting entity,
   the method further comprising configuring said first object to display, in response to a stimulus, an additional map indicating a relationship between a first child entity belonging to said first constituent entity and a second child entity belonging to said first constituent entity.

20. The method of claim 19, further comprising selecting said first constituent entity to include an assembly language module and selecting said second constituent entity to include a higher-level language module.

21. The method of claim 19, further comprising selecting said first constituent entity from a group consisting of a module, a function, a procedure, an instruction, a set of modules, a set of functions, a set of procedure, and a set of instructions.

22. The method of claim 19, wherein generating a table comprises incorporating management information into said table.

23. The method of claim 22, further comprising selecting said management information to include information indicative of a designated authority associated with said first constituent entity.

24. The method of claim 19, further comprising selecting said relationship to include existence of a shared entity common to said first and second constituent entities.

25. The method of claim 19, further comprising selecting said relationship to include a reference from said first constituent entity to said second constituent entity.

26. The method of claim 19, further comprising selecting said graphical connecting entity on the basis of said relationship between first constituent entity and said second constituent entity.

27. The method of claim 19, wherein displaying said relationship comprises listing said second constituent entity in response to selection of said first constituent entity.

28. A computer-readable medium having encoded thereon software for displaying the logical structure of heterogeneous source code, said software comprising instructions for:
   reading source code having a first constituent entity expressed in a first programming language and a second constituent entity expressed in a second programming language;
   generating a table containing information indicative of a relationship between said first constituent entity and said second constituent entity of said source code; and
   displaying said relationship between said first and second constituent entities;
   wherein said instructions for displaying said relationship comprise instructions for displaying a map of said relationship; and
   wherein said instructions for displaying said map comprise instructions for:
      displaying a first object representative of said first constituent entity;
      displaying a second object representative of said second constituent entity; and
      connecting said first object to said second object by a graphical connecting entity,
   wherein said software further comprises instructions for configuring said first object to display, in response to a stimulus, an additional map indicating a relationship between a first child entity belonging to said first constituent entity and a second child entity belonging to said first constituent entity.

29. The computer-readable medium of claim 28, wherein said software further comprises instructions for selecting said first constituent entity to include an assembly language module and selecting said second constituent entity to include a higher-level language module.

30. The computer-readable medium of claim 28, wherein said software further comprises instructions for selecting said first constituent entity from a group consisting of a module, a function, a procedure, an instruction, a set of modules, a set of functions, a set of procedures, and a set of instructions.

31. The computer-readable medium of claim 28, wherein said instructions for generating a table comprise instructions for incorporating management information into said table.

32. The computer-readable medium of claim 31, wherein said software further comprises instructions for selecting said management information to include information indicative of a designated authority associated with said first constituent entity.

33. The computer-readable medium of claim 28, wherein said software further comprises instructions for selecting said relationship to include existence of a shared entity common to said first and second constituent entities.

34. The computer-readable medium of claim 28, wherein said software further comprises instructions for selecting said relationship to include a reference from said first constituent entity to said second constituent entity.

35. The computer-readable medium of claim 28, wherein said software further comprises instructions for selecting said graphical connecting entity on the basis of said relationship between first constituent entity and said second constituent entity.

36. The computer-readable medium of claim 28, wherein instructions for displaying said relationship comprise instructions for listing said second constituent entity in response to selection of said first constituent entity.

* * * * *

UNITED STATES PATENT AND TRADEMARK OFFICE
CERTIFICATE OF CORRECTION

| | |
|---|---|
| PATENT NO. | : 7,203,925 B1 |
| APPLICATION NO. | : 09/953226 |
| DATED | : April 10, 2007 |
| INVENTOR(S) | : Ofer Michael et al. |

It is certified that error appears in the above-identified patent and that said Letters Patent is hereby corrected as shown below:

Title Page, Item (75) Inventors, delete "Leo Cory" and replace with -- Leo Corry --.

Signed and Sealed this

Seventh Day of August, 2007

JON W. DUDAS
*Director of the United States Patent and Trademark Office*